United States Patent [19]

Meerman

[11] Patent Number: 4,728,351

[45] Date of Patent: Mar. 1, 1988

[54] METHOD FOR DENSIFYING A PREFORMED POROUS BODY OF A MATERIAL THE MAIN CONSTITUENT OF WHICH IS SIO₂

[75] Inventor: Wilhelmus C. P. M. Meerman, Eindhoven, Netherlands

[73] Assignee: U.S. Philips Corporation, New York, N.Y.

[21] Appl. No.: 794,865

[22] Filed: Nov. 4, 1985

Related U.S. Application Data

[63] Continuation-in-part of Ser. No. 694,569, Jan. 24, 1985, abandoned.

[30] Foreign Application Priority Data

Nov. 7, 1984 [NL] Netherlands ......................... 8403380

[51] Int. Cl.⁴ ...................... C03B 23/20; C03B 21/00; C03B 11/00; C03C 10/00
[52] U.S. Cl. ......................................... 65/18.1; 65/33; 65/103; 65/111
[58] Field of Search ...................... 65/2, 13, 18.1, 18.4, 65/32, 33, 103, 108, 111, 144

[56] References Cited

U.S. PATENT DOCUMENTS

| | | | |
|---|---|---|---|
| 4,126,436 | 11/1978 | Bailey | 65/13 |
| 4,477,274 | 10/1984 | Janssen et al. | 65/13 |
| 4,547,644 | 10/1985 | Bair et al. | 65/13 |
| 4,617,041 | 10/1986 | Meerman | 65/18.1 |

FOREIGN PATENT DOCUMENTS

2129418 5/1984 United Kingdom .

OTHER PUBLICATIONS

R. Susa et al., "New Optical Fibre Fabrication Method", Electronics Letters, 6/10/82, vol. 18, No. 12, pp. 499–500.

Primary Examiner—S. Leon Bashore
Assistant Examiner—Michael K. Boyer
Attorney, Agent, or Firm—Paul R. Miller

[57] ABSTRACT

Porous bodies of a material which comprises $SiO_2$ as the main constituent are heated by passing a zone of high temperature through the body. The zone of high temperature is obtained by irradiation with light of a wavelength which is absorbed by the porous part of the body but is not absorbed by the densified part of the body ($\lambda < 3$ μm). The device preferably comprises a rotatable radiation source (2) surrounding the body (6) to be densified.

12 Claims, 3 Drawing Figures

METHOD FOR DENSIFYING A PREFORMED POROUS BODY OF A MATERIAL THE MAIN CONSTITUENT OF WHICH IS SiO₂

This application is a continuation in part of U.S. Ser. No. 694,569, filed Jan. 24, 1985, now abandoned.

The invention relates to a method of densifying a preformed porous body of a material having a main constituent of $SiO_2$ to form a body of an optically transparent glass by passing a zone of high temperature through the body.

BACKGROUND OF THE INVENTION

It is generally known to increase the density of porous bodies consisting mainly of $SiO_2$ by heating such bodies in a furnace.

The major problem in this method is to prevent gas bubbles from being included in the glass during densification. It has therefore already been suggested to pass a softening front through the body while using an annular furnace. In this case heating of the densified body by convection cannot be avoided. (See, for example, German published Patent Application DE-OS No. 3 240 355). When this method is used small gas bubbles or vacuum cavities (vacuoles) may also still be present after densification. It is therefore recommended in this method to ensure that the gas bubbles are filled with helium or hydrogen. In a subsequent thermal treatment the gases may diffuse away out of the glass. The vacuoles must then be driven out by a thermal treatment.

In this method the possibility exists for the glass to be heated at a high temperature for such a period of time that crystallisation of the glass may occur if the major constituent is $SiO_2$. It is the object of the invention to provide a method of increasing the density of a porous pre-formed body of a material having a main constituent of $SiO_2$ in which the formed transparent glass essentially is not heated.

A material having a major constituent of $SiO_2$ is to be understood to mean in this connection a material which comprises an excess of $SiO_2$ and further admixtures (dopants) in a quantity as is usual either to reduce or to increase the refractive index of silica glass by a percentage as is usual for the application of the glasses in optical fibres. The material is also to be understood to include a material which comprises only $SiO_2$ including inevitable impurities.

SUMMARY OF THE INVENTION

This object is achieved by means of a method which is characterized in that the densification is carried out with infrared radiation of a wavelength smaller than a wavelength which is essentially absorbed by the transparent glass with the radiation source and the porous body being moved relatively with respect to each other, and means are provided to prevent the body in the non-densified condition and after densification from being heated by convection and/or by infrared radiation of a wavelength which is absorbed by the transparent glass.

In the method according to the invention the property is used that infrared radiation of a wavelength smaller than that which is essentially absorbed by transparent glass having a main constituent of $SiO_2$ (smaller than approximately 3 $\mu$m) is absorbed substantially in the porous body in those places where reflection or scattering occurs. This enables the density of the body to be increased by means of a sharply progressing zone of a high temperature when the radiation source and the porous body are moved relatively with respect to each other. The gases to be driven out get sufficient escape possibilities so that a thermal after-treatment of the densified body is not necessary. In the method according to the invention the formed transparent glass is also prevented from being heated in a manner which might result in crystallisation.

The means, which prevent the body in the non-densified condition and after densification from being heated by convection and/or by infrared radiation having a wavelength absorbed by the bright glass ($\lambda > 3$ $\mu$m), may consist, for example, of a screen of transparent silica glass present between the radiation source and the body to be sintered. In a preferred embodiment of a method according to the invention the densification is carried out with a radiation source which surrounds the body to be densified on all sides and which is accommodated in a space between two tubes with the inner tube being of silica glass and the outer tube being cooled.

By making the inner tube of silica glass, infrared radiation having a wavelength $\lambda > 3$ $\mu$m which may be emitted by the radiation source is absorbed. A rise in temperature of the silica glass tube may in this case be prevented by passing a gas through the space between the tubes. As a result of this, heat of convection is also dissipated. An extra effect is obtained by subjecting the outer tube to a forced cooling with, for example, water. The gas which is passed through the space between the tubes may be, such as a gas which does not react chemically with the radiation source, for example, nitrogen, helium or argon, or mixtures of these gases. If the source of radiation does not emit radiation having a wavelength of $\lambda > 3$ $\mu$m the space between the two tubes can be evacuated. The radiation source may be, for example, of carbon, graphite, zirconium oxide, molybdenum, tungsten, and the like. The radiation member may be inductively heated or heated by direct current passage.

The method according to the invention is particularly suitable for densifying porous bodies having an outer circumference with the shape of a body of revolution. The bodies may, for example, consist of hollow or solid cylinders from which tubes and solid rods, respectively, are formed upon densifying.

In the densification of porous bodies having an outer circumference in the shape of a body of revolution, a radiation source is preferably used in the form of a hollow cylinder omnilaterally surrounding the body to be densified.

In spite of a careful centering of the porous body within the cylindrical radiation body it has been found in practice that a non-uniform heating of the body to be densified sometimes occurs. This non-uniform heating may give rise to warping of the densified body. Non-uniform heating, however, can be avoided to a considerable extent by rotating the body during densification. During densification the centering may be supervised visually by means of a mirror which is placed outside the heating device in the elongation of the axis at an angle 45° with respect to the axis of the body to be densified. Since the body is rotating, however, it is difficult to establish visually how a deviation, if any, from the centering of the body has to be corrected.

This difficulty is avoided in an embodiment of the invention in which a radiation source is used in the form of a hollow cylinder surrounding the porous body to be densified with the body and the hollow cylinder being positioned with respect to each other in such manner that the axis of the hollow cylinder coincides with the axis of the body. The hollow cylinder is rotated about its axis and the non-rotating body and the hollow cylinder are moved relatively to each other in a direction parallel to the axis. In this embodiment of the method a device is used having a radiation source in the form of a hollow cylinder being heated inductively by means of an RF-coil.

During densification the centering of the stationary body to be densified can be simply controlled and corrected.

In other embodiments of the invention in which control and correction during sintering is considerably simplified, the body to be densified is surrounded by a guide tube of quartz glass in which optionally the body can be axially moved. By means of the guide tube the body to be sintered is centered in the center of the radiation source having the form of a hollow cylinder. In one embodiment the inside diameter of the tube and the diameter of the body to be sintered are matched to each other so that because of the friction between the guide tube and the body to be sintered, a force oriented along the axis is exerted on the body during a relative movement of the body in a direction opposite to the direction of gravity. Hence the sintering front moves through the body in a direction at right angles oriented to the earth's surface. The axially directed force effectively suppresses the tendency to warp during sintering. Correction of place on position during sintering has become superfluous. This also applies if the sintering front deviates from the ideal position by some cause or other (the ideal position would be at right angles to the center line of the body to be sintered). An extra stretching effect can be obtained by providing in the space above the body to be sintered a gas pressure exceeding 1 bar.

Preformed porous bodies obtained by means of a so-called sol-gel process in particular can be densified to form bright bodies of glass by means of the method according to the invention. In the sol-gel process, an alkoxy silane in alcoholic solution is gelled by the addition of water. The resulting gel is then dried and densified (see, for example, Electronics Letters, June 10, 1982, Vol. 18, No. 12, pp. 499–500).

The porous body may be of doped $SiO_2$, for example $GeO_2$-doped $SiO_2$. If a doping is used which gives rise to absorption of radiation at a wavelength $\lambda < 3$ $\mu$m, it is recommended to provide between the radiation source and the porous body a radiation screen of silica glass which comprises the same doping as the porous body in a quantity which is sufficient to absorb the undesired part of the spectrum as much as possible. In this manner it is also achieved that in this case the transparent doped silica glass obtained in the densification absorbs no radiation or substantially no radiation.

A reduction of the content of hydroxyl groups can be effectively produced in the method according to the invention by performing the densification in a flowing gas atmosphere containing chlorine or a chlorine compound, for example, thionyl chloride.

Of course it is possible to perform the method according to the invention in a number of steps, in which in a first step the porous body is not maximally densified, and in a last step it is densified to form transparent, pore-free glass. In this manner it must be possible to obtain a glass having a content of hydroxyl groups being in the order of 0.01 ppm, and also when the starting product has been obtained by means of a process in which much hydrogen, whether or not bound to the $SiO_2$, is present.

BRIEF DESCRIPTION OF THE DRAWINGS

Embodiments of the method according to the invention will be described in greater detail with reference to the accompanying drawings. In the drawings

DESCRIPTION OF THE PREFERRED EMBODIMENTS

Figure 1:
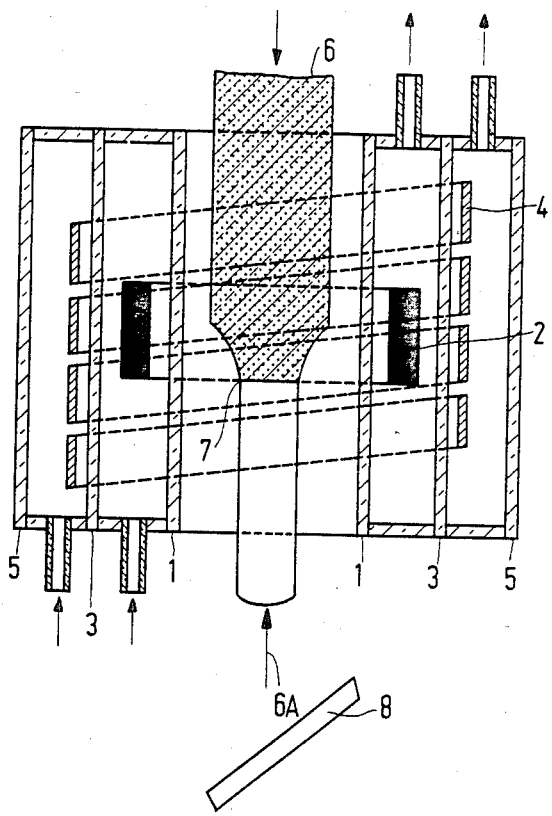
FIG. 1 shows diagrammatically a part of a device for use in an embodiment of a method according to the invention.

The device comprises in principle a silica glass tube 1 and a rotatable annular radiation source 2 of graphite. The radiation source 2 is present in a space bounded by the silica glass tube 1 and a second tube 3 which also consists of silica glass.

The annular radiation source 2 in practice bears on a support present in the space between the tubes 1 and 3 (not shown in the figure to avoid complexity of the drawing) and absorbs no or substantially no energy from the electric field. The support is rotated about its longitudinal axis (not shown). An inert gas is passed through the space enclosed by the tubes 1 and 3. The object of this is, on the one hand, to dissipate heat of convection and, on the other hand, to cool tube 1. Ring 2 is heated inductively by means of coil 4 present in a space between tube 3 and tube 5. A coolant, for example demineralised water, can be passed through the space enclosed by the tubes 3 and 5 to cool the tube wall 3. Oil having a sufficiently high electrical resistance (for example, transformer oil) may also be used as a coolant. A porous preform 6 of $SiO_2$ is provided in the space enclosed by silica glass tube 1 at such a rate that a clear sintering front can form as a result of the radiation emitted by the radiation source 2. Heating by convection of the preform 6 or the sintered part of transparent silica glass 6A is not possible because heat of convection is dissipated via the gas flow through the space between tubes 1 and 3 and the coolant in the space between tubes 3 and 5. The part 6A of transparent silica glass cannot be heated by radiation of a wavelength $\lambda < 3$ $\mu$m since such radiation if emitted by the radiation source, is absorbed by the silica glass tube 1.

Figure 2:
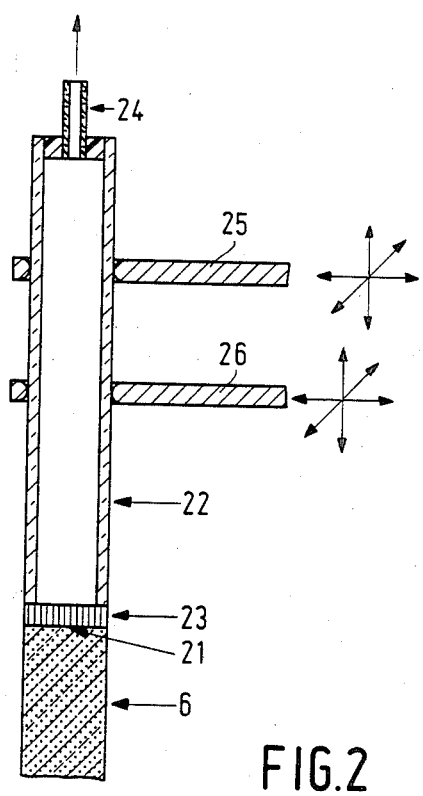
FIG. 2 shows diagrammatically a holding and centering device.

In carrying out the method (see also FIG. 2) a porous body 6 is first of all provided with an end face 21 which is perpendicular to the axis of the body 6, for example, in the form of a solid cylinder consisting of a dried $SiO_2$ gel. A tube 22, for example, of glass, is pressed against the end face 21 and, the tube end facing the face 21, comprising a porous plate 23 which is permanently connected to tube 22. Via the outlet 24 a vacuum which is sufficient to hold body 6 against the porous plate 23 is applied in the tube. In the embodiment shown, the tube 22 is held by two arms 25 and 26 which, independently of each other, can move, the held part of the tube to the left and to the right in the plane of the drawing and forwardly and backwardly perpendicular to the plane of the drawing. Both arms 25 and 26 are coupled in so far as the movement upwardly and downwardly in the plane of the drawing are concerned (not shown in the drawing). The porous body 6 is provided in the silica glass tube 1 (FIG. 1) by means of the arms 25 and 26 to move the densification front 7 through the body 6. During densification the position of the body 6 and of the densified part 6A is checked via mirror 8. The position is corrected, if necessary, by means of the arms 25 and 26.

Figure 3:
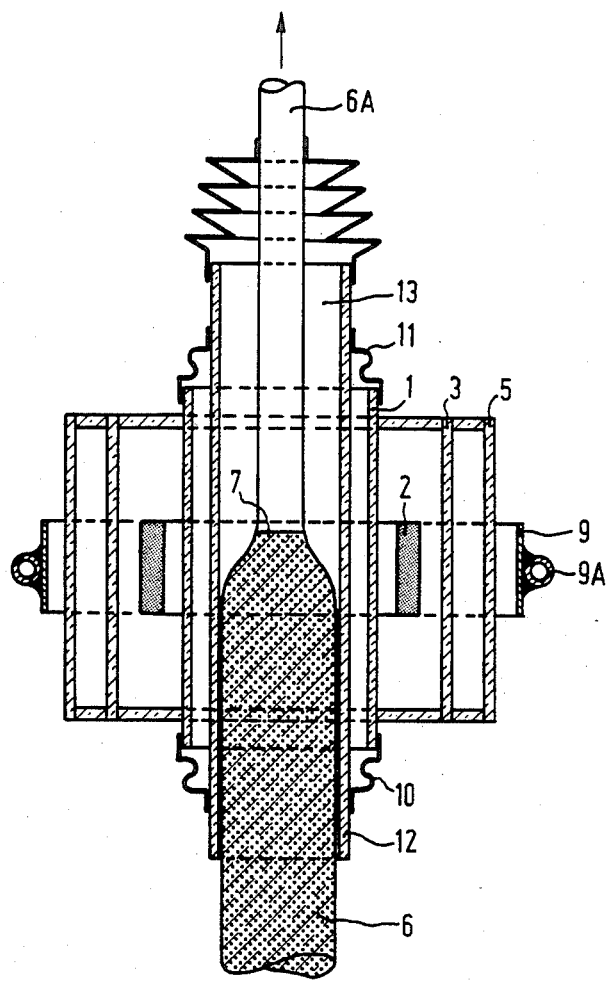
FIG. 3 shows diagrammatically a part of a device for use in another embodiment of a method in accordance with the invention.

Another embodiment will be described with reference to FIG. 3. FIG. 3 is a diagrammatic sectional view of a part of a device for sintering a preformed porous body. Identical parts have been referred to by the same reference numberals as in the preceding FIGS. 1 and 2. In a tightly fitting tube 12 of quartz glass which can be oriented with respect to the annular radiation source 2 the porous body 6 of silica gel is present having a diameter of 16 mm. A suitable cooling gas is passed through the space between the quartz glass tube 12 and the quartz glass tube 1, for example helium or dry nitrogen. A suitable protective gas which protects the material of the radiation source from oxidation, for example dry nitrogen, is passed through the annular radiation source 2 in the space between the quartz glass tubes 1 and 3. Water for cooling is passed through the space between the quartz glass tubes 3 and 5 as well as through the copper pipe 9A. The space between the tubes 1 and 12 is sealed by means of flexible seals 10 and 11 of silicone rubber. During operation, high frequency current is passed through the Rf-coil consisting of one turn (frequency 500 kHz) and the radiation source 2 is rotated at a speed of 200 rpm. In this embodiment also a stable sharp sintering front is obtained during sintering which, however, need not necessarily be at right angles to the center line of the body 6 to be sintered. However, this has no detrimental influence on the straightness of the sintered part of bright quartz glass 6A. All of this is the result of the force which is necessary to overcome the friction between the body 6 to be sintered and the tube 12. This force is exerted by drawing the sintered part 6A out of the device in a direction opposite to the direction of gravity. Keeping the sintered part 6A straight is still promoted if in the space 13 a gas pressure higher than atmospheric pressure is maintained (for example with nitrogen, pressure between 1 and 2 bar). It is alternatively possible to give the seals 10 and 11 a rigid construction and to produce the centering of the body 6 with respect to the radiation source 2 by varying the position and the place of the radiation source 2 with respect to the center line of the body 6.

In this arrangement, porous bodies having a diameter of 80 to 100 mm and a length of 1 to 2 m can be densified in a comparatively simple manner to form a solid body/tube or rod.

According to another embodiment of the invention there is no relative movement between the porous body 6 and the tightly fitting tube 12. In this embodiment tube 12 and the porous body 6 are moved together through the heating device with the same velocity. Also, in this case no warping during sintering of the body will occur. A silica tube can be used for the tube 12 in which the porous body 6 has been produced by gelification of a suitable starting material.

In the embodiments using a guide tube one of the beneficial effects obtained is that even in case the axis of the porous body 6 is not exactly centered in the ring-shaped radiation source 2 no warping will occur during sintering after the sinterfront has reached a stationary situation.

What is claimed is:

1. A method of densifying a preformed porous body of an optically transparent glass having a main constituent of $SiO_2$ comprising the steps of surrounding a preformed porous body of an optically transparent glass by a quartz glass guide tube, said guide tube fitting against said porous body to prevent warping of said porous body, applying infrared radiation to said porous body by a hollow cylinder radiation source to form a sintered zone, said infrared radiation having a wavelength smaller than wavelengths absorbed by said transparent glass, said hollow cylinder radiation source coaxially surrounding and being spaced from said porous body and said guide tube.

rotating said hollow cylinder radiation source about said porous body, moving said hollow cylinder radiation source relative to said porous body and said guide tube in a direction parallel to a longitudinal axis of said porous body, and preventing said porous body from being heated by at least one of convection and of infrared radiation having wavelengths absorbed by said transparent glass, said step of preventing heating being carried out by a cylinder of silica glass between said guide tube and said hollow cylinder radiation source.

2. A method according to claim 1, wherein said porous body becomes sintered upon passing through said hollow cylindrical radiation source, and the sintered body is drawn in a direction opposite to the direction of gravity.

3. A method according to claim 2, wherein said sintered body is maintained at a pressure between 1 and 2 bar.

4. A method according to claim 1, wherein said porous body and said guide tube are moved together through said hollow cylinder radiation source of the same velocity.

5. A method according to claim 1 or claim 3 or claim 4, wherein said wavelength of said infrared radiation is smaller than 3 $\mu$m.

6. A method according to claim 1 or claim 2 or claim 3 or claim 4, wherein said hollow cylinder radiation source is enclosed in an enclosed space, and wherein a cooling gas is passed between said guide tube and said cylinder of silica glass, and at least a second cooling gas is passed into said enclosed space.

7. A method according to claim 6, wherein a further enclosed space is formed coaxially surrounding said enclosed space, and wherein a cooling fluid is circulated in said further enclosed space.

8. A method according to claim 1 or claim 3 or claim 4, wherein high frequency current is passed through said hollow cylinder radiation source, said high frequency current being approximately 500 KHz.

9. A method according to claim 1 or claim 2 or claim 3 or claim 4, wherein said hollow cylinder radiation source is rotated at a speed of 200 rpm.

10. A method of densifying a preformed porous body of material having a main constituent of $SiO_2$ to form a body of an optically transparent glass by passing a zone of high temperature through said body comprising the steps of densifying said preformed porous body by the steps of applying to said porous body infrared radiation having a wavelength smaller than wavelengths absorbed by said optically transparent glass and moving said infrared radiation relative to said preformed porous body, wherein said step of applying infrared radiation is carried out by a radiation source being a hollow cylinder surrounding said porous body to be densified, said hollow cylinder having an axis along said cylinder coinciding with a longitudinal axis of said porous body, preventing said porous body in a non-densified condition or after densification from being heated by at least one of convection and infrared radiation having said wavelengths absorbed by said optically transparent glass, rotating said hollow cylinder about said axis of said hollow cylinder, and moving said porous body and said hollow cylinder with respect to each other in a direction along said longitudinal axis and said axis of said hollow cylinder, and forming said porous body in a guide tube to be moved coaxially with the porous body, said guide tube being accommodated within a cylinder of quartz glass between said hollow cylinder and said guide tube, said radiation source forming a sintering front moving through said porous body in the direction of gravity.

11. A method according to claim 10, wherein a pressure exceeding 1 bar is produced within said guide tube above said sintering front of said porous body.

12. A method of densifying a preformed porous body of a material having a main constituent of $SiO_2$ to form a body of an optically transparent glass by passing a zone of high temperature through said body comprising the steps of densifying said preformed porous body by the steps of applying to said porous body infrared radiation having a wavelength smaller than wavelengths absorbed by said optically transparent glass and moving said infrared radiation relative to said preformed porous body, wherein said step of applying infrared radiation is carried out by a radiation source being a hollow cylinder surrounding said porous body to be densified, said hollow cylinder having an axis along said cylinder coinciding with a longitudinal axis of said porous body, preventing said porous body in a non-densified condition or after densification from being heated by at least one of convection and infrared radiation having said wavelengths absorbed by said optically transparent glass, rotating said hollow cylinder about said axis of said hollow cylinder, and moving said porous body and said hollow cylinder with respect to each other in a direction along longitudinal axis and said axis of said hollow cylinder, and forming said porous body in a guide tube of a quartz glass, said guide tube being moved together with said porous body, and said guide tube being accommodated within a cylinder of quartz glass between said hollow cylinder and said guide tube, said radiation source forming a sintering front moving through said porous body.

* * * * *